Jan. 8, 1929.  
W. J. MILLER  
1,697,993  
MOLD CONVEYING AND POTTERY FABRICATING MECHANISM  
Filed Jan. 6, 1927   2 Sheets-Sheet 1

INVENTOR  
*William J. Miller*  
BY *K. G. Doub*  
ATTORNEY

Jan. 8, 1929.

W. J. MILLER 1,697,993

MOLD CONVEYING AND POTTERY FABRICATING MECHANISM

Filed Jan. 6, 1927   2 Sheets-Sheet 2

INVENTOR:
William J. Miller
BY
ATTORNEY

Patented Jan. 8, 1929.

1,697,993

UNITED STATES PATENT OFFICE.

WILLIAM J. MILLER, OF SWISSVALE, PENNSYLVANIA.

MOLD-CONVEYING AND POTTERY-FABRICATING MECHANISM.

Application filed January 6, 1927. Serial No. 159,395.

My invention relates to the manufacture of articles from plastic materials, more particularly to the art of making pottery, and it consists in the novel features, which are hereinafter more fully described.

One object of the invention consists in combining with a mold conveyer, jiggers or other mechanisms for cooperating with the molds, the jiggers or other mechanisms being designed to temporarily and intermittently travel with the conveyor so as to perform the operations for which they are intended.

A further object of my invention is—to shape the charge of material on molds, which are supported on a train of carriers, while the latter are travelling, to avoid starting and stopping said train, thereby saving time and power.

Another object of my invention is—to have a perfected jigger combined with a conveyor, whereby molds may be automatically brought to and carried away from a jigger.

A further object of my invention is to apply the above features to a multiple jigger, such as described in my application for patent for multiple and automatic jiggers filed Nov. 17, 1926, Serial No. 148,872.

Another object of my invention is to provide a mold conveying and pottery fabricating mechanism which may serve as a part of an automatic system or cycle of operations, wherein ware may be produced automatically from the supply of suitable material to the finished product without any intermediate manual handling of the partly finished products between any one step and the next following step in the cycle of operations.

A still other object of my invention is—to provide a mechanism of the character described which is simple, durable and inexpensive.

Other objects and advantages will hereinafter appear.

I attain these objects by the mechanism, illustrated in the accompanying drawings, or by any mechanical equivalent or obvious modification of the same.

11 designates a movable frame, which is mounted on rolls 12, which are in contact with and roll on a pair of horizontal channel shaped rails 13, which are stationary with relation to the ground and supported in position by a stationary frame 73, which is mounted on a base plate 72.

Figure 2:
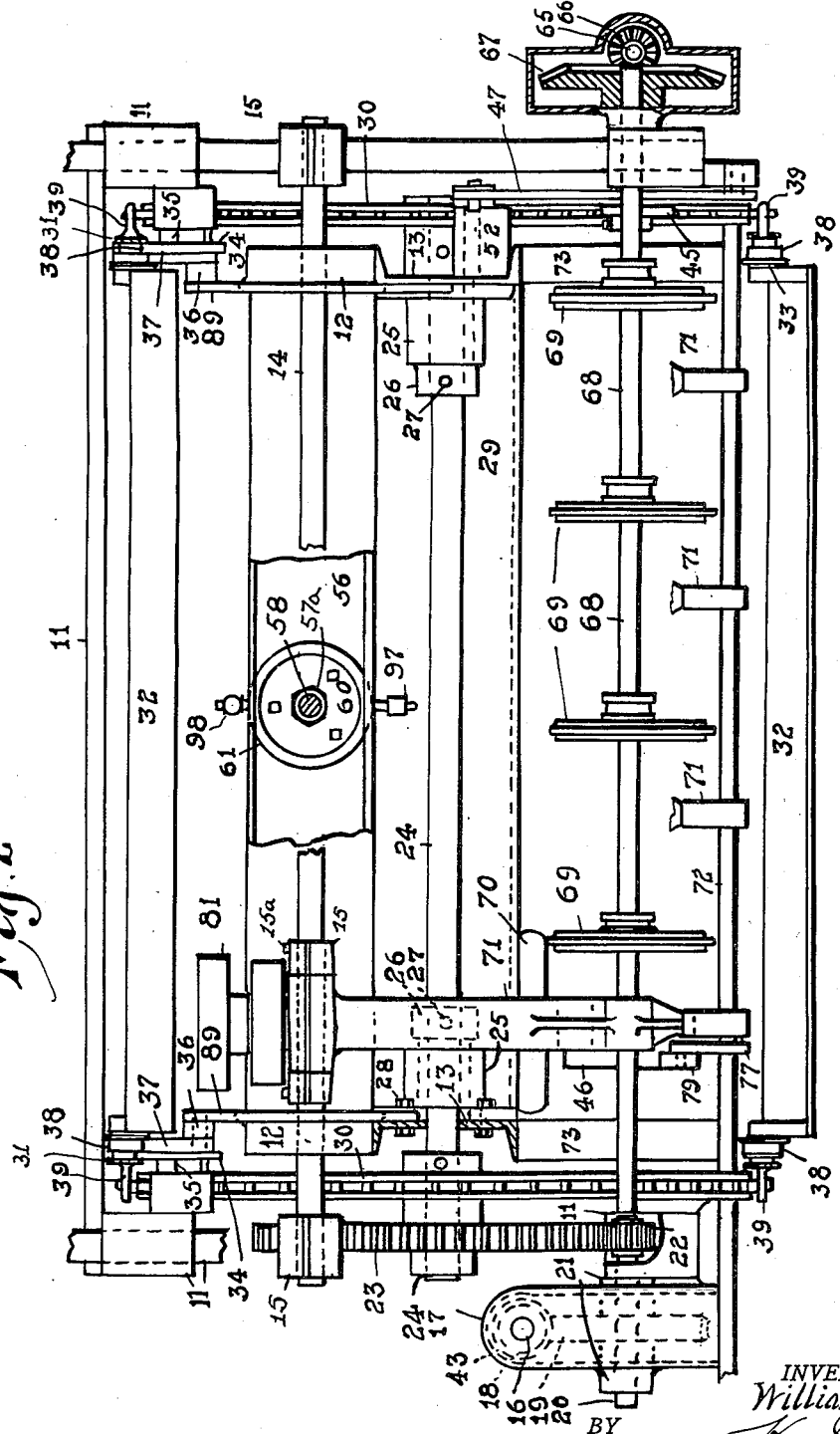
Figure 2 is an end view of the mechanism, parts also being broken away.

A pair of axles 14 are employed for connecting said movable frame 11 to said rolls 12; the latter may be revolvably mounted on said axles 14, which may have their ends secured to said frame 11 by means of clamps 15, which are embodied therein, as shown in Fig. 2 of the drawings, and held together by cap screws 15ª.

A power shaft 16 is shown as revolvably supported at one end thereof by a pair of bearings 17, which are formed at the upper end of a housing 96 for a worm gear 19.

The housing 96 is stationary with relation to the ground, and is mounted on said base plate 72.

Figure 1:
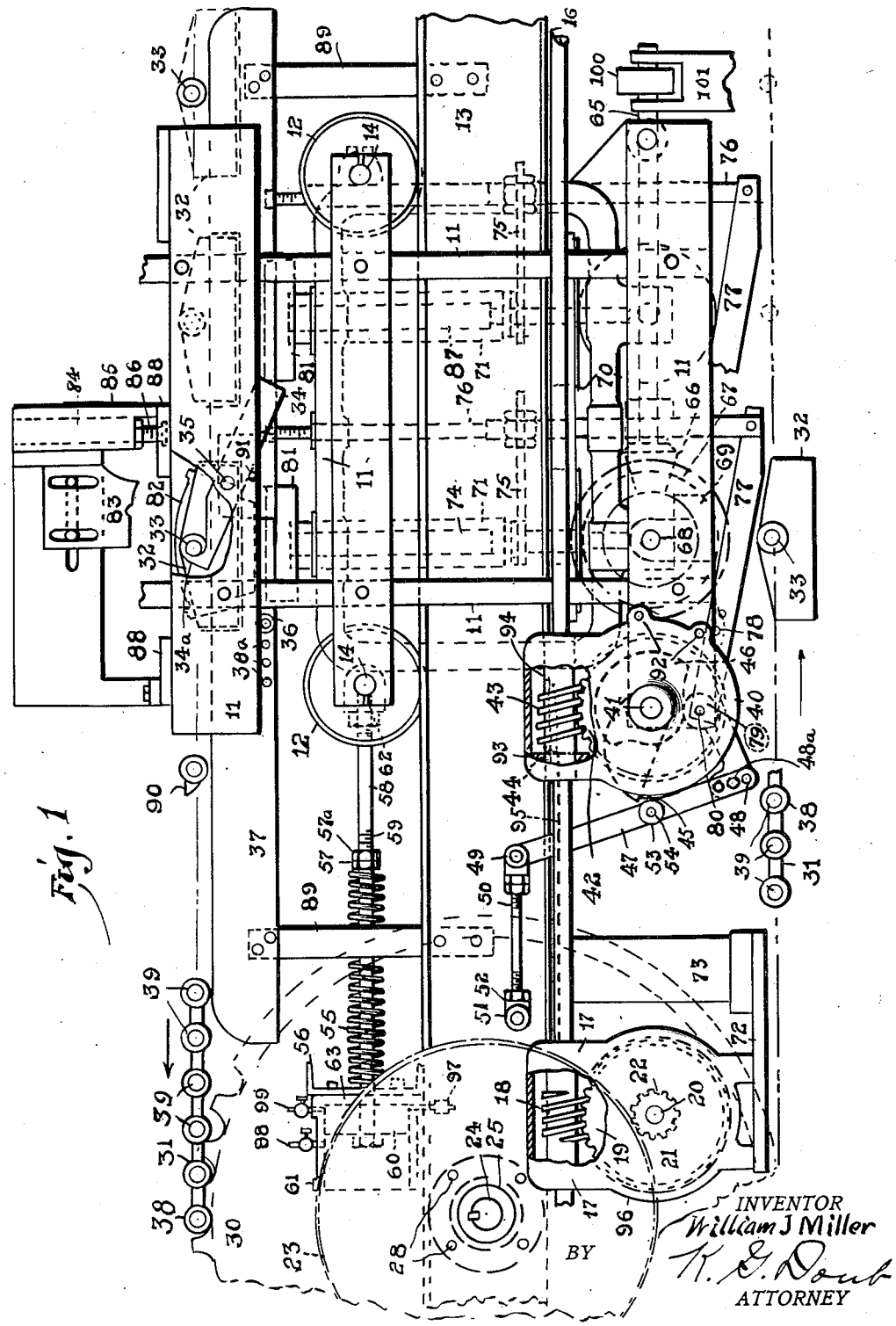
Figure 1 is a side elevational view of the mechanism, with parts broken away.

A worm 18 is shown in Fig. 1 as secured to the end of said shaft 16, in mesh with said gear 19, which is mounted on a spindle 20; the latter is revolvably supported by bearings 21, which may be made integrally with said housing 96, and are stationary with relation to the ground.

A pinion 22 is secured to said spindle 20 in mesh with a spur gear 23, which is secured to one end of a shaft 24, which passes through said rails 13, and is revolvably supported intermediate its ends by bearings 25, which are shown in Fig. 2 as adjustably secured to said rails 13, by means of screws or bolts 28, which pass through enlarged openings in said rails 13, whereby said bearings 25 may be adjusted in position on said rails 13.

Collars 26 are shown in Fig. 2 as adjustably secured to said shaft 24 by means of set screws 27, to abut against said bearings 25, to prevent longitudinal displacement of said shaft 24 from its adjusted position.

A pair of horizontal channel shaped beams 29 is shown in Fig. 2 as secured to the ends of said rails 13, to space the latter apart; the beams 29 may preferably be welded to said rails 13 and form an integral rectangular frame therewith.

The shaft 24 has also adjustably mounted thereon a pair of wheels or sprockets 30, in mesh with flexible conveyor members, preferably chains, 31, which are employed for conveying mold carriers 32; the latter are pivotally connected, preferably at a point above the center of gravity thereof, to said chains 31 by means of trunnions 33, whereby said carriers 32 may always remain substantially horizontal.

The chains 31 are kept in mesh with said sprockets 30 by suitable means.

The direction of motion of said chains 31 and carriers 32 is indicated by arrows in Fig. 1 of the drawings.

Latches 34 are provided with hooks 34ª at their upper ends, and are pivotally connected at the middle parts thereof by means of pins 35 to said movable frame 11; the lower ends of said latches 34 are made heavier and longer than the upper ends thereof, and said latches 34 are, therefore, impelled by gravity to have said hooks 34ª thereon engage the ends of said trunnions 33, as the latter with the conveyor chains 31 pass over said latches 34, which are employed to interlock said frame 11 with said conveyor chains 31 and the carriers 32 thereon, to travel therewith for an interval of time, during which said conveyor chains 31 move said frame 11 by means of said latches 34, until the latter are intercepted by a pair of pins 36, which may be adjustably secured each in one of a series of interchangeable openings 36ª in one of a pair of stationary rails 37 of the machine; the rails 37 are shown as secured to columns 89, which are in turn adjustably secured to said rails 13; the rails 37 serve as guides for rolls 38, which are mounted on said trunnions and on the link pins 39 of said chains 31.

The pins 36 intercept the lower part of said latches 34, thereby causing the latter to be disengaged from said trunnions 33 at a predetermined point, whereby the movable frame 11 is disconnected from the said conveyor chains 31

Pins 91 are provided on said frame 11, to limit the rotation of said latches 34 on their pivots 35, to prevent excessive elevation of said hooks 34ª.

The frame 11 has secured thereto by means of screws 92, a housing 40 for a worm gear 42, which is revolvably mounted on a shaft 41, in mesh with a worm 43.

The housing 40 has thereon bearings 93 for the hub 94 of said worm 43, which is slidably mounted on said shaft 16 by means of a sliding key 44 in the bore of said worm 43 and a corresponding groove 95 in said shaft 16, whereby the worm 43 both slides on and revolves with said shaft 16, and turns said shaft 41, while the latter with the housing 40 and bearings 93 thereon is carried along by said frame 11.

The shaft 41 has also adjustably secured thereto by means of suitable set screws one or more cams 45 and a number of cams 46, for purposes, which are hereinafter described.

A floating lever 47 is pivotally connected at one end thereof by means of a pin 48 and multiple interchangeable openings 48ª to an extension of said frame 11 and at the other end thereof by means of a pin 49 to an adjustable oscillating arm 50, which is pivotally connected by means of a pin 51 to a stationary part 52 of the machine.

Said lever 47 with said arm 50 form an irregular toggle joint.

A roll 53 is pivotally connected by means of a pin 54 to said lever 47, in intermittent contact with said cam 45.

The cam 45 has its phase of motion adjusted to act on said roll 53 after said latches 34 have been disengaged from said trunnions 33 by means of said pins 36, as hereinbefore described, and the reaction of said lever 47 at said roll 53 causes said cam 45 and said shaft 41 to move said frame 11 from left to right in Fig. 1 approximately until said latches 34 engage the trunnions 33 of the next carrier 32 on said chains 31.

In this way the movable frame 11 has imparted thereto a reciprocating horizontal motion on said rails 13, the extent of which is determined by the position of said pins 36 on said rails 37, also by the distance of said trunnions 33 on said chains 31 and carriers 32 from each other.

Where multiple jiggers are arranged in series, to wit: where the jiggers are multiple in the direction of the motion of the conveyors, only some of the trunnions 33 are to be engaged by the hooked ends 34ª of the latches 34; the other trunnions, which are not to be so engaged, are provided at their ends with cams 90, as shown in Fig. 1, which pass over said hooks 34ª without being engaged thereby.

As an alternative to said cam 45 and toggle joint 47—50 or as an auxiliary or in addition thereto, a pair of compression springs or one spring 55 may be employed for reversing the motion of said frame 11, as shown in Fig. 1.

The springs 55 are abutting each at one end thereof against a channel shaped beam 56, which is secured on said rails 13 transversely thereto and may be welded thereto, and at the other end thereof against one of a pair of nuts 57—57ª which are adjustably positioned on each of a pair of rods 58 by means of threaded portions 59 thereon.

The nuts 57 serve for varying and adjusting the pressure of the springs 55, and the nuts 57ª act as safety nuts, to prevent the displacement of said nuts 57 on said rods 58.

The rods 58 pass through openings in said beams 56, and are connected each at one end thereof to a piston 60, which is slidably positioned in a cylinder 61, and are at the other end thereof adjustably connected to said frame 11, as at 62. If desired only one cylinder 61, one piston 60 and one rod 58 may be used, as shown in Fig. 2.

It is evident that said springs 55 will be compressed by the said frame 11, when the latter is carried along by the said conveyor chains 31 in a direction from right to left in Fig. 1, as is hereinbefore described, and will tend to propel said frame 11 in the opposite direction (or from left to right in Fig. 1) when said frame 11 is released from said chains 31, as hereinbefore described.

The cylinder 61 is open at the rear or left end thereof in Fig. 1, and is provided with an automatic check valve 97 and two adjustable stop valves 98 and 99.

Air is admitted to the interior of said cylinder 61, when said piston 60 is moving outwardly, and is compressed by said piston 60 on its return stroke; the valves 98 and 99 may be adjusted, gradually to discharge the compressed air from the interior of said cylinder 61 and to maintain therein any desired pressure, thereby offering a resistance to the motion of said piston 60 in said cylinder 61 in a direction from left to right in Fig. 1.

The action of said pistons 60 in said cylinders 61 serves to check the suddenness of the action of said springs 55 on said frame 11, to prevent shocks to the parts of the machine.

The resilient structure just described may also serve to prevent rebound or overrunning of the frame 11, which may ensue when the latches 34 first engage the trunnions 33, and consequent misalinement of the trays with the chucks and fabricating units that may be carried by said frame, by maintaining a constant, readily regulated resistance to the movement of the frame, and furthermore, this resilient structure may provide for a more even and regular movement of the frame 11 than would be possible by the use of the cam 45 and toggle joint structure 47—50 alone. In order to save time for the fabricating operation, it is usually desirable to return the frame 11 at a higher rate of speed than is attained by said frame during its movement with the conveyor, and this resilient structure may further serve to avoid peak load or an excessive use of power to start the frame on its return movement, thus effecting an economy in the cost of operation.

The said frame 11 has also revolvably mounted thereon a power shaft 65, which is parallel to said shaft 16, and has secured thereto at the inner end thereof a bevel gear 66, in mesh with a bevel gear 67, which is secured to the end of a shaft 68, which is also revolvably mounted on said frame 11, parallel to said shaft 41.

The shaft 65 may be driven by a suitable motor, which may be carried by said frame 11; but I prefer to mount the motor stationary, and to gear it to a pulley 100, which is in spline sliding engagement with said shaft 65, which is revolvably supported on said frame 11; to prevent longitudinal displacement of said pulley 100 on said shaft 65, a bifurcated bearing 101 may be provided for the hubs of said pulley 100, which bearing may be stationary with relation to the ground.

The shaft 68 has also mounted thereon a number of vertically disposed friction gears 69, to act on horizontally disposed friction gears 70 of multiple jiggers 71, such as described in my above copending application.

The jiggers 71, served by said shaft 68, may be placed in parallel, to wit: in a line transversely to said conveyor 31, and may be adjustably supported by said frame 11.

Jigger spindles 74 are shown in Fig. 1 as connected by forks 75 to pitmen 76, which are reciprocated by levers 77, which have shiftable pivots 78, substantially as described in my above copending application.

Rolls 79 are pivotally connected to said levers 77 by means of pins 80, and are in contact with said cams 46, which are adjustably secured to said shaft 41 by means of set screws, which are not shown.

The cams 46 in this way actuate the pitmen 76 with the jigger spindles 74, which terminate at their upper ends in chucks 81, intermittently to raise molds 82 from said carriers 32, to bring them into operative position under profiles 83, which are connected to sliding members 84 on brackets 85, substantially as described in my above copending application.

The sliding members 84 have adjustably connected thereto at the underside thereof screws 86, which are shown in Fig. 1 in an inverted position.

The pitmen 76 are shown as extended upwardly for contacting with said screws 86 during the operation of the machine, for a purpose, which is described in my above copending application.

Similar pitmen 76 also actuate another set of jiggers 87 with molds 82 thereon, which may either work in series with said jiggers 71, or they may have plastic material fed thereto by a mechanism, which is described in my copending application for method and mechanism for feeding plastic material to molds, filed Dec. 7, 1926, Ser. No. 153,086.

The additional jiggers 87 may have the plastic material on the mold 82 thereof preformed, preliminary to having said material finally shaped by said profiles 83 and said jigger chucks 81.

The jigger spindles 87 may be rotated and reciprocated independently of said jigger spindles 74 by cams similar to 46, which may be driven by a separate motor, if desired, but in timed relation to the reciprocation of the said frame 11.

The conveyor chains 31 with the mold carriers 32 thereon are arranged to pass through the frame 11, when the latter is not connected thereto, without interfering therewith or being interfered thereby; they are also arranged to pass under base plates 88 of said bracket 85, which are mounted on said frame 11, transversely to said chains 31, without being interfered with by said base plates.

After passing the jiggers 71, the mold carriers may be conveyed to suitable treating chambers, such as dryers and the like.

Independent motors may be provided for actuating said shafts 16 and 65; the first of these motors may be stationary, and the latter may be mounted on said frame 11, to move therewith if desired.

The carriers 32 have each therein multiple openings for supporting molds over said multiple jiggers 71; the latter may also be arranged in series as above mentioned, to wit: in the direction of the travel of said conveyor chains 31.

The multiple jiggers 71 may also be arranged both in parallel and in series and the mold carriers 32 provided with a corresponding number and arrangement of openings for molds, substantially as described in my first mentioned copending application.

The number of chains 31 may be increased, and also reduced to one, if desired.

The jiggers may be stationary and the motion of the chains 31 intermittent, if desired.

The number of jiggers may be reduced, and in small plants only one jigger may be employed.

The latches 34 may be replaced by other means for connecting the frame 11 to the conveyor chains 31, if desired; and other means than the pin 36 may be employed for disengaging the latches 34 from the trunnions 33, if desired. The cam 45 may be provided with grooves and the frame 11 reciprocated both ways by the said cams 45.

Instead of an endless chain conveyor an endless train other than a chain, such as one on an endless track, may be used for conveying the mold carriers to and from the jiggers and through the dryers and other treating chambers.

By the term "train" in the claims I designate generally a line of carriers, whether carried by a chain or propelled in any other way or manner.

The springs 55 may be tensile springs and positioned at the other end of said frame 11, if desired.

Many other changes may be made in my automatic jigger and mold conveyor combined, without departing from the main scope of my invention, and parts of my invention may be used without other parts.

I do not, therefore, restrict myself to the details as shown; but I intend to include also all mechanical equivalents and obvious modifications of the same within the scope of my invention.

I claim as my invention, and desire to secure by Letters Patent:

1. In a pottery machine, an endless flexible conveyor for molds, means for propelling said conveyor, and means adapted to intermittently travel with said conveyor to cooperate with the molds.

2. In a pottery machine, an endless flexible conveyor for molds, means for propelling said conveyor, means adapted to intermittently travel with said conveyor to cooperate with the molds, and means for intermittently connecting said mold cooperating means with said conveyor.

3. In a pottery machine, a train of carriers for conveying molds, means for propelling said train, a movably mounted frame, means on said frame for cooperating with the molds, and means for intermittently connecting said frame to the train to travel therewith.

4. In a pottery machine, an endless train of carriers for conveying molds, means for propelling said train, a movably mounted frame, means on said frame for cooperating with the molds, an automatic means for intermittently connecting said frame to the train to travel therewith.

5. In a pottery machine, a train of carriers for conveying molds, means for propelling said train, a movably mounted frame, one or more jiggers supported thereby, means for actuating said jiggers, and means for intermittently connecting said frame to the train to travel therewith.

6. In a pottery machine, a train of carriers for conveying molds, means for propelling said train, a movably mounted frame, means on said frame for cooperating with the molds, means for intermittently connecting said frame to the train, and means for disconnecting said frame from the train.

7. In a pottery machine, an endless train of carriers for conveying molds, means for propelling said train, a movably mounted frame, means on said frame for cooperating with the molds, means for intermittently connecting said frame to the train, and means for automatically disengaging said connecting means.

8. In a pottery machine, one or more endless flexible conveyors for molds, means for propelling said conveyors, a movably mounted frame, means on the frame for cooperating with the molds, and means for intermittently connecting said frame to the conveyors.

9. In a pottery machine, an endless conveyor for molds, means for propelling said conveyor, a movably mounted frame, means on said frame for cooperating with the molds, and one or more latches connected to said frame and adapted to cooperate with said mold conveyor to impart movement to the frame.

10. In a pottery machine, an endless conveyor for molds, means for propelling said conveyor, a movably mounted frame, means on said frame for cooperating with the molds, and one or more latches pivoted to said frame and adapted to connect the frame to the conveyor so as to move therewith.

11. In a pottery machine, an endless conveyor for molds, mold carriers for said conveyor, trunnions on said mold carriers, means for propelling said conveyor, a movably mounted frame, means on the frame for cooperating with the molds, one or more latches on the frame, said latches being so disposed as to engage said trunnions to cause the frame to move with the conveyor.

12. In a pottery machine, an endless conveyor for molds, mold carriers for said conveyor, trunnions on said mold carriers, means for propelling said conveyor, a movably mounted frame, means on the frame for cooperating with the molds, one or more latches pivoted to the frame and adapted to engage said trunnions, and means adapted to be engaged by said latches to automatically disengage them from the trunnions.

13. In a pottery machine, an endless conveyor for molds, mold carriers for said conveyor, trunnions on said mold carriers, means for propelling said conveyor, a movably mounted frame, means on the frame for cooperating with the molds, one or more latches pivoted to the frame above the center of gravity of the latches whereby the latches tend to assume vertical positions, said latches adapted to engage the trunnions on said molds, and one or more stationary pins adapted to be engaged by said latches below their pivot points so as to disengage the latches from the trunnions.

14. In a pottery machine, a train of carriers to convey molds, means for propelling said train, a movably mounted frame, means on said frame for cooperating with the molds, means for intermittently connecting said frame to the train, means for disconnecting the frame from the train, and means for returning the frame to normal position.

15. In a pottery machine, an endless train of carriers for conveying molds, a movably mounted frame, means on the frame for cooperating with the molds, means for automatically connecting said frame to the train to travel therewith, means for automatically disconnecting the frame from the train, and means for automatically returning the frame to normal position.

16. In a pottery machine, an endless train of carriers for conveying molds, a movably mounted frame, means on the frame for cooperating with the molds, means for connecting said frame to the train to travel therewith, means for disconnecting the frame from the train, and a continuous motion device for returning the frame to normal position.

17. In a pottery machine, an endless train of carriers for conveying molds, a movably mounted frame, means on the frame for cooperating with the molds, means for connecting said frame to the train to travel therewith, means for disconnecting the frame from the train, and means including a rotary member for returning the frame to normal position.

18. In a pottery machine, an endless train of carriers for conveying molds, a movably mounted frame, means on the frame for cooperating with the molds, means for connecting said frame to the train to travel therewith, means for disconnecting the frame from the train, a lever, and a cam cooperating with said lever to return the frame to normal position.

19. In a pottery machine, an endless train of carriers for conveying molds, a movably mounted frame, means on the frame for cooperating with the molds, means for connecting said frame to the train to travel therewith, means for disconnecting the frame from the train, a stationary part, a lever operatively connected therewith and with the frame, and means on the frame cooperating with the lever to return the frame to normal position.

20. In a pottery machine, an endless train of carriers for conveying molds, a movably mounted frame, means on the frame for cooperating with the molds, means for connecting said frame to the train to travel therewith, means for disconnecting the frame from the train, a stationary part, an arm pivotally connected to said stationary part, a lever pivoted to said arm and said frame, and a cam on said frame and cooperating with said lever to return said frame to normal position.

21. In a pottery machine, an endless train of carriers for conveying molds, a movably mounted frame, means on the frame for cooperating with the molds, means for connecting said frame to the train to travel therewith, means for disconnecting the frame from the train, means for returning said frame to normal position, and resilient means to serve as an auxiliary to said returning means.

22. In a pottery machine, an endless train of carriers for conveying molds, a movably mounted frame, means on the frame for cooperating with the molds, means for connecting said frame to the train to travel therewith, means for disconnecting the frame from the train, means for returning said frame to its normal position, and means for cushioning the return stroke of the frame.

23. In a pottery machine, a train of carriers for conveying molds, a stationary frame, a power shaft thereon for actuating said train of carriers, a movably mounted frame, means on the movable frame for cooperating with said molds, and means for transmitting motion from the power shaft to the means cooperating with said molds.

24. In a pottery machine, a train of carriers for conveying molds, a stationary frame, a power shaft thereon for actuating said train of carriers, a movably mounted frame, means on the movable frame for cooperating with said molds, a shaft rotatably mounted on the movable frame for actuating the means cooperating with the molds, and means for transmitting motion from said power shaft to said last-named shaft.

25. In a pottery machine, an endless train of carriers for conveying molds, means for propelling said train, means adapted to intermittently travel with said train to cooperate with a plurality of molds simultaneously, means for intermittently connecting said mold cooperating means with said train, and means adapted to be associated with said train to render said connecting means inoperative under certain conditions.

26. In a pottery machine, an endless train of carriers for conveying molds, means for propelling said train, means adapted to intermittently travel with said train to cooperate with one mold or with a plurality of molds, means for intermittently connecting said mold cooperating means with said train, and cams adapted to be connected with said train to render said connecting means inoperative under certain conditions.

WILLIAM J. MILLER.